United States Patent
Jain et al.

(10) Patent No.: US 11,128,593 B2
(45) Date of Patent: Sep. 21, 2021

(54) EVENT-BASED ELECTRONIC COMMUNICATIONS MANAGEMENT

(71) Applicant: Dropbox, Inc., San Francisco, CA (US)

(72) Inventors: Aditi Jain, San Francisco, CA (US); Manveer Singh Chawla, San Francisco, CA (US); Swapnil Zarekar, Santa Clara, CA (US); Yuanshen Xu, San Francisco, CA (US); Karandeep Johar, San Francisco, CA (US); Gianluca Venturini, San Francisco, CA (US); Henry Tay, San Francisco, CA (US); Aaron Feldstein, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 276 days.

(21) Appl. No.: 15/851,630

(22) Filed: Dec. 21, 2017

(65) Prior Publication Data
US 2019/0199674 A1 Jun. 27, 2019

(51) Int. Cl.
| | |
|---|---|
| *G06F 15/16* | (2006.01) |
| *H04L 12/58* | (2006.01) |
| *G06F 16/901* | (2019.01) |
| *H04W 4/12* | (2009.01) |
| *G06F 3/0482* | (2013.01) |
| *H04L 29/08* | (2006.01) |
| *G06F 3/0484* | (2013.01) |

(52) U.S. Cl.
CPC .......... *H04L 51/34* (2013.01); *G06F 16/9024* (2019.01); *H04L 51/36* (2013.01); *G06F 3/0482* (2013.01); *G06F 3/04847* (2013.01); *H04L 67/26* (2013.01); *H04W 4/12* (2013.01)

(58) Field of Classification Search
CPC ..... H04L 51/34; H04L 51/36; G06F 16/9024; G06F 3/04847
USPC .................................................. 709/206
See application file for complete search history.

(56) References Cited

U.S. PATENT DOCUMENTS

| | | | |
|---|---|---|---|
| 2014/0215443 A1* | 7/2014 | Voccio | G06F 11/3688 717/128 |
| 2016/0283849 A1* | 9/2016 | Kozloski | G06Q 10/06 |
| 2018/0239959 A1* | 8/2018 | Bui | G06F 40/103 |
| 2019/0019197 A1* | 1/2019 | Roberts | G06N 3/084 |

OTHER PUBLICATIONS

Wikipedia, "URL" https://en.wikipedia.org/wiki/URL, dated Dec. 22, 2017, 4 pages.
(Continued)

Primary Examiner — George C Neurauter, Jr.
Assistant Examiner — Joel Mesa
(74) Attorney, Agent, or Firm — Hickman Becker Bingham Ledesma LLP; Adam C. Stone

(57) ABSTRACT

Techniques for event-based electronic communications management. In one embodiment, for example, the techniques include obtaining a directed graph representing a messaging track. Based on detecting an event pertaining to a user, the directed graph is traversed via a directed edge of the graph from a non-messaging action node of the graph to a messaging action node of the graph. Based on traversing the directed graph, the messaging action is caused to be performed. The techniques enable more targeted and timely event-driven electronic messaging campaigns.

20 Claims, 5 Drawing Sheets

(56) References Cited

OTHER PUBLICATIONS

Wikipedia, "Text Messaging", https://en.wiki[edia.org/wiki/Text_messaging, dated Dec. 22, 2017, 30 pages.
Wikipedia, "Push Notification", https://en.wikipedia.org/wiki/Push_Notification, dated Dec. 22, 2017, 3 pages.
Wikipedia, "Protocol Buffers" https://en.wikipedia.org/wiki/Protocol_Buffers, dated Dec. 22, 2017, 4 pages.
Wikipedia, "Pop-up Notification" https://en.wikipedia.org/wiki/Pop-up_notification, dated Dec. 22, 2017, 2 pages. Wikipedia, "JSON", https://en.wikipedia.org/wiki/JSON, dated Dec. 22, 2017, 13 pages.
Wikipedia, "Email", https://enwikipedia.org/wiki/Email, dated Dec. 22, 2017, 17 pages.
Wikipedia, "Apache Kafka", https://en.wikipedia.org/wiki/Apache_Kafka, dated Dec. 22, 2017, 4 pages.

\* cited by examiner

EVENT-BASED ELECTRONIC COMMUNICATIONS MANAGEMENT

TECHNICAL FIELD

The technical field of the present invention relates to a distributed computer network system, and in particular, to systems and methods for managing electronic communications with users of an online service in a more effective manner.

BACKGROUND

Operators of online services want to communicate with their users. The reasons for wanting to communicate with their users vary. Typically, the goal of communicating is to enhance the users' experience, engagement, and satisfaction with the online service. For example, the operator may want to inform users about a new feature of the online service, or otherwise inform users about how they can better utilize the online service.

To be effective, communications must be targeted and timely. A communication to a user is targeted if the communication is received by the user and the content of the communication is relevant to the user. The communication is timely if it is received by the user at a time when the user is likely to act on or respond to the communication. A communication to a user that is not targeted and timely may be ignored or disregarded by the user.

The techniques disclosed herein address these issues.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
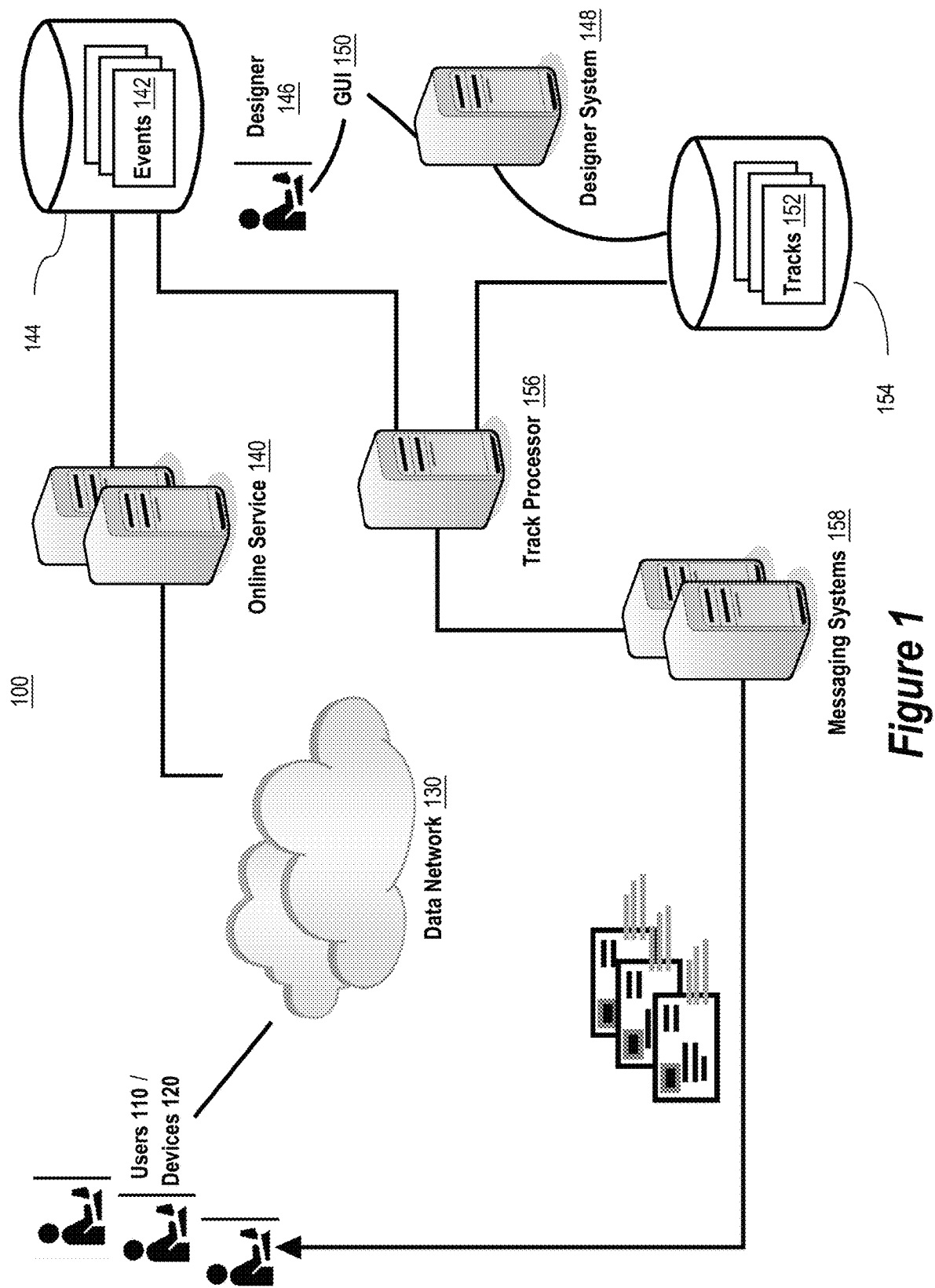
FIG. 1 is a block diagram that depicts an example system for event-based electronic communications management.

In the following description, for the purposes of explanation, numerous specific details are set forth in order to provide a thorough understanding of the present invention. It will be apparent, however, that the present invention may be practiced without these specific details. In other instances, well-known structures and devices are depicted in block diagram form in order to avoid unnecessarily obscuring the present invention.

General Overview

The sequence and timing of communications can affect how well the communications are received by users. For example, assume a user of an online service has already received an Email communication prompting the user to try out a new feature of the online service. The operator of the online service may wish to send a push notification about the new feature to the user, if the user does not open the Email message within a particular period of time (e.g., within 7 days of being sent). On the other hand, if the user opens the Email message before the particular time period expires, then the operator may wish to send another Email to the user providing more details about the new feature.

The sequencing and timing of the subsequent communications with respect to the original Email can be critically important. For example, if the additional Email providing more details about the new feature is sent to the user without the context of the user having just opened the original Email, then the user might be confused by or uninterested in the details about the new feature in the additional Email. In this case, the additional Email may be "lost" on the user.

It would be highly desirable to have systems and methods of managing electronic communications with users of an online service, including managing the sequencing and timing of the communications so that the communications are targeted and timely. It would also be highly desirable to gain insight into how effective the communications are at enhancing the users' experience, engagement, and satisfaction with the online service.

The techniques described herein address these issues.

The techniques described herein cause a messaging action for a user that is on a messaging track based on a detected event pertaining to the user. A directed graph representing the messaging track is obtained. The directed graph has nodes and one or more directed edges connecting the nodes. Each of the nodes represents a respective action which can be a messaging action. Each directed edge is between two of the nodes and represents a state transition on the messaging track from the respective action represented by one of the two nodes to the respective action represented by the other of the two nodes. Based on detecting an event pertaining to the user, the directed graph is traversed for the user from a non-messaging node to a messaging action node via the directed edge connecting the nodes, thereby causing a message specified by the respective messaging action represented by the messaging action node to be automatically provided to the user. By traversing the directed graph based on detecting the event pertaining to the user, the techniques overcome the issues of sequencing and timing communications so that they are targeted and timely discussed above. As such, the techniques enable event-driven electronic communication campaigns in which the sequencing and timing of communications is targeted and timely.

Referring again to the example above in more detail, in some embodiments, a messaging track may represent a campaign for evangelizing a new feature of an online service. In this case, the messaging track might have four actions. A first action might send an Email message to a user announcing the new feature. A second action might then wait for a period of time (e.g., one week) for the user to open the Email message. A third action might send a follow-up Email message to the user further evangelizing the new feature with more detail about the new feature, if the user opens the announcement Email message within the period of time. And a fourth action might send a push notification to the user announcing the new feature, if the user does not open the announcement Email message within the period of time. In this case, the directed graph representing the messaging track can be traversed from the node representing the second action (wait one week for use to open announcement Email)

to the node representing the third action (send additional Email) upon detecting an event indicating that the user opened the announcement Email message within the period of time. Based on the traversal, the additional Email is automatically caused to be sent to the user.

Various embodiments include the ability to view analytics pertaining to selected actions of a messaging track. This may help visualize how targeted and timely the communications of a messaging a campaign is and whether sequencing, timing, and/or content of the communications should be adjusted or modified to achieve better targeting and timeliness.

Electronic Communication Management System

Turning to FIG. 1, in some embodiments, users 110 use their user devices 120 (e.g., smart phones, tablets, laptops, desktop computers, etc.) to use online service 140 via a data network 130 (e.g., the Internet, a WAN, a LAN, etc.). For example, online service 140 can provide specific functionality for consumers (e.g., an Internet service), for businesses, or for enterprises.

In some embodiments, online service 140 provides content management and/or content collaboration services for content items (e.g., documents, images, music, video, or other digital content or files). As users 110 use (or do not use) online service 140 they cause events 142 to be generated and stored in attached data storage 144.

Events 142 pertain to the users 110 and reflect how the users 110 use (or do not use) online service 140. Events 142 can reflect user input to the online service 140 such as individual user clicks and other user input events. Events 142 can reflect analytics conducted on user input events such as analytics that aggregate user input events to determine a patterns of a use of online service 140 by users 110. For example, events 142 may reflect that a particular user is a mobile user because he/she more often or recently or frequently uses the online service 140 using a mobile computing device (e.g., smart phone) as opposed to a desktop or stationary computing device. Events 142 can reflect monitoring conducted on resources of online service 140 used by users 110. For example, users 110 may each have a content item storage quota with online service 140. In this case, events 142 may reflect the percentage of a user's storage quota that is consumed by the user.

In some embodiments, a messaging track designer user 146, a part of a messaging track design process being executed by messaging track designer system 148, designs (assembles) one or more messaging tracks. A messaging track may be defined as a partially ordered set of actions where at least one of the actions is a messaging action. A messaging action may be defined as an action of messaging track that involves electronic communication with a user. No particular form of electronic communication is required but typically is an Email message, a push notification, a text message, a pop-up notification, or other "passive" electronic communication directed to a user that does not force the user to interact with the communication in order to continue the computer task the user was engaged in when the electronic communication was received by the user. As discussed above, the messaging track may be represented as a directed graph where the nodes (vertices) of the graph correspond to the actions and the directed edges of the graph represent unidirectional state transitions on the messaging track between the actions corresponding to the nodes connected by the directed edges.

In some embodiments, a messaging action involves an electronic communication whereby secondary online content is displayed in conjunction with primary online content. The secondary online content may be the electronic communication. The primary online content may be content that the user intended to obtain from the online service. For example, the primary online content may be a home web page or other web page or content served by the online service that is requested by the user (e.g., by selecting a link to the content). The secondary online content may be presented together along with the user requested primary online content. For example, if the primary online content is a requested web page of the online service, then the secondary online content that is the electronic communication may include graphics, links, and/or text presented in a model or non-model form on or above the primary content of the web page.

Preferably, the designer system 148 allows a messaging track to be designed in a visual manner by interacting with a computer graphical user interface 150 using user input (e.g., keyboard, pointing device, and/or touch-sensitive surface-based user input). In some embodiments, the computer graphical user interface 150 includes a graphical representation of the directed graph that represents the messaging track. By interacting with the graphical user interface 150, a user can add nodes corresponding to actions to messaging track, remove nodes corresponding to actions from the messaging track, define the parameters of the actions of the messaging track, and defined state transitions on the messaging track by connecting nodes corresponding to actions together with directed edges.

The designer system 148 may be used to design multiple messaging tracks representing different electronic communication "campaigns." For example, a messaging track may represent a campaign to promote an enterprise or business application of a content collaboration online service to a user that is currently only an individual consumer of the online service. In this case, the messaging track might have two actions. A first action might put a user on the messaging track if the user shares a document with another user in the same Email domain as the sharing user. The second action might send an Email to the sharing user inviting the sharing user to use the business application free-of-charge on a trial basis. This example messaging track is represented as a directed graph in FIG. 2. As another example, a messaging track may represent a campaign for evangelizing a new feature of an online service. In this case, the messaging track might have four actions. A first action might send an Email message to a user announcing the new feature. A second action might then wait for a period of time (e.g., one week) for the user to open the Email message. A third action might send a follow-up Email message to the user further evangelizing the new feature, if the user opens the announcement Email message within the period of time. And a fourth action might send a push notification to the user announcing the new feature, if the user does not open the announcement Email message within the period of time. This example messaging track is represented as a directed graph in FIG. 3.

Designer system 148 may be used to design a messaging track that is composed of various different types of actions. Multiple actions, including actions of different types, may be flexibly assembled using the designer system 148 in a directed graph arrangement that meets the requirements of a particular messaging campaign at hand.

Messaging tracks 152 designed using designer system 148 are stored in a directed graph representation in attached storage 154. Messaging track processor 156 may process messaging tracks 152 based on events 142 including interfacing (e.g., via remote procedure calls) with messaging systems 158 to carry out messaging actions specified in the messaging tracks 152.

Example Process for Processing a Messaging Track

Figure 3:
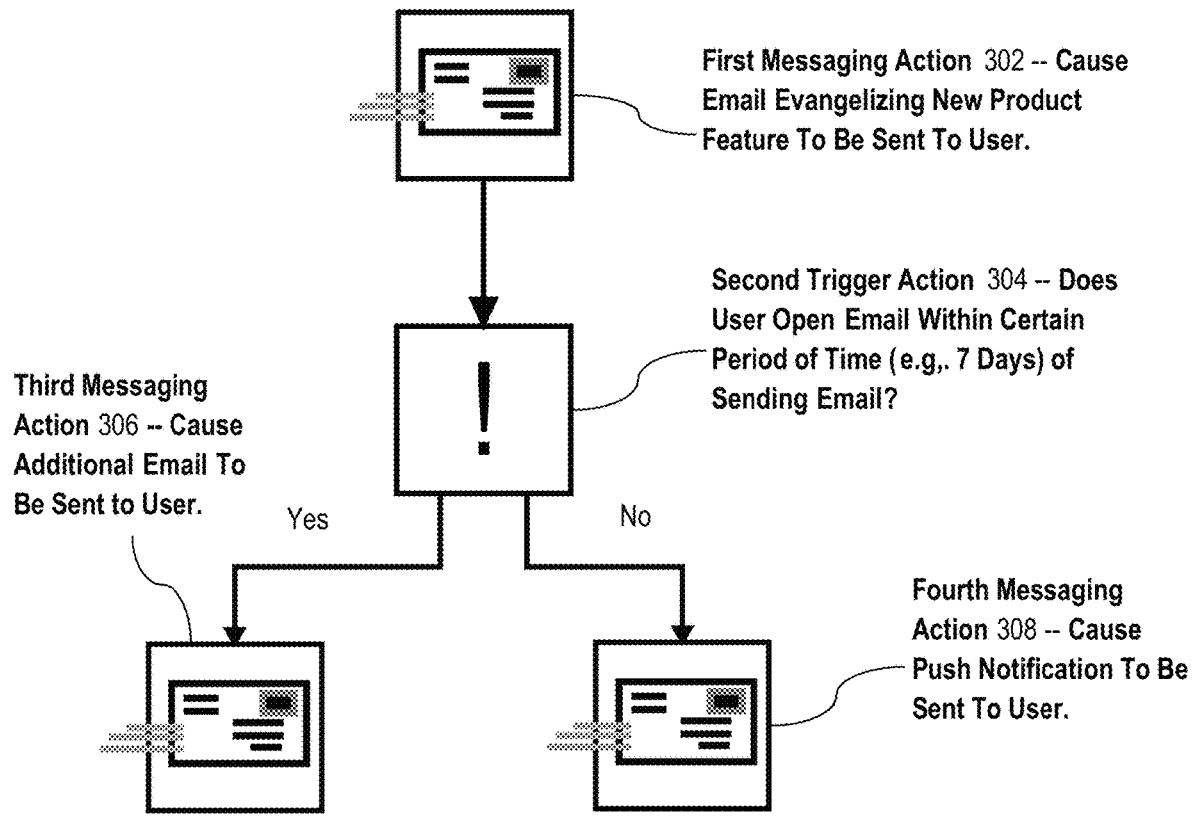
FIG. 3 is a directed graph representation of an example messaging track.
Figure 4:
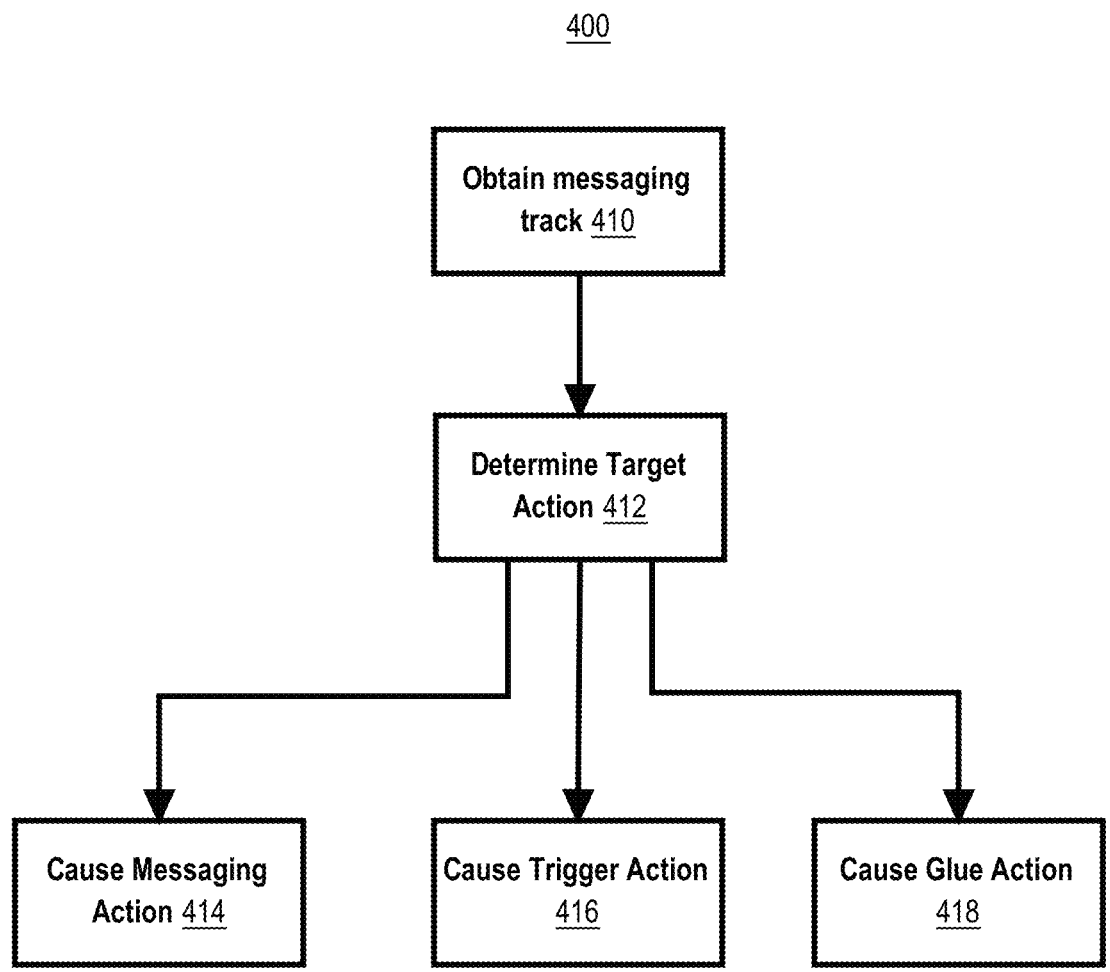
FIG. 4 depicts a process for processing a messaging track for a user.

FIG. 4 depicts a process 400 for automatically processing a messaging track for a user. Process 400 proceeds by obtaining 410 a messaging track from storage 154. The messaging track can be obtained under a variety of different circumstances. For example, as part of marketing campaign process, the messaging track for the marketing campaign may be obtained in response to a user providing user input to kick-off the campaign. The user input may be provided via a graphical user interface whereby a user selects the messaging track (possibly from among a plurality of available messaging tracks) and then selects "Start", "Go", or the like, to kick-off the campaign. As another example, a messaging track may be obtained in response to a detecting an event for the user that indicates or specifies that the user should be started on the first action of the messaging track or that the user should transition to a new action on the messaging track, if the user is already started on the messaging track. For example, an event might be detected that indicates that a new user has signed up (e.g., created a user account) with the online service. In that case, in response to detecting this event, a messaging track for onboarding new users to the online service may be obtained. An event pertaining to a user might be detected in a situation where the user is already on the messaging track. In this case, the messaging track may be obtained to transition the user on the messaging track to a new action on the messaging track. For example, the detected event might be the user opening an initial Email sent to the user as part of an initial messaging action of the messaging track, as in the example messaging track of FIG. 3 discussed above.

The obtained 410 messaging track may be in any appropriate format. For example, the messaging track may contain data defining the directed graph that represents the messaging track including the nodes representing the actions of the messaging track. The data may include the parameters of each action including the type of the action (messaging, trigger, or glue) and action type-specific parameters, specific to the action type. For example, the action-type parameters of a messaging action may contain the content (or pointer thereto) of the message to send. Example formats for the obtained 410 messaging track include serialized formats of the directed graph representing the messaging track. Example serialized formats include JavaScript Objection Notation (JSON), eXtensible Markup Language (XML), and the like.

After obtaining 410 the messaging track, the process determines 412 the target action of the messaging track for the user. The target action is the initial or next action of the messaging track to carry out for the user. If the target action is the initial action, then this is sometimes referred to as putting or starting the user on the messaging track. If the target action is not the initial action of the messaging track, then this is sometimes referred to as transitioning the user on the messaging track. In some embodiments, the target action is determined based on a detected event pertaining to the user. For example, the detected event may indicate that the user is to be started on the messaging track, if the user is not already started on the messaging track. In this case, the target action is the initial action of the messaging track. On the other hand, the detected event may indicate that the user is to be transitioned on the messaging track. In this case, the target action is not the initial action but may be a next action that immediately follows a current action on the messaging track according to the directed graph representation of the messaging track. In particular, the nodes of the directed graph representing the current action and the next action may be connected by a directed edge in the directed graph from the current action to the next action.

Events can be detected in different ways. For example, events can be detected via a push and/or pull messaging mechanism. Examples of a push messaging mechanism is a messaging system that implements a publish/subscribe model mechanism. In contrast to a push messaging mechanism, a pull messaging mechanism involves the client initiating the request for events to a server which responds with the requested events. Push/pull hybrids are also possible such as by using long polling mechanisms. However detected, an event pertaining to a user may be discarded or ignored if not relevant to the user's current state on the messaging track. For example, if a user is already started on a messaging track and an event is detected that would otherwise start the user on the messaging track, then the event can be ignored or discarded. Similarly, if a user on a messaging track has already transitioned to or beyond the target action, then an event that would otherwise transition the user to the target action may be ignored or discarded.

Once the target action is determined 412, then the target action is caused to be performed for the user. This may vary depending on the type of the target action. According to some embodiments, there are three general types of actions: messaging actions (414), trigger actions (416), glue actions (418).

A messaging action (414) includes causing an electronic communication to be received by the user. This may vary depending on the type of electronic communication as specified by the messaging action. For example, if the electronic communication is an Email message, the Email message may be sent (addressed) to the user's Email address. If the electronic communication is a push notification, then an application programming interface (API) call may be made to a third-party push notification service to cause a push notification to be sent to the user's device. If the electronic communication is a text message, then the text message may be sent to the user (e.g., to the user's cell phone number). If the electronic communication is a pop-up notification, then the online service may signal an application installed on the user's device to present the pop-up notification.

Figure 2:
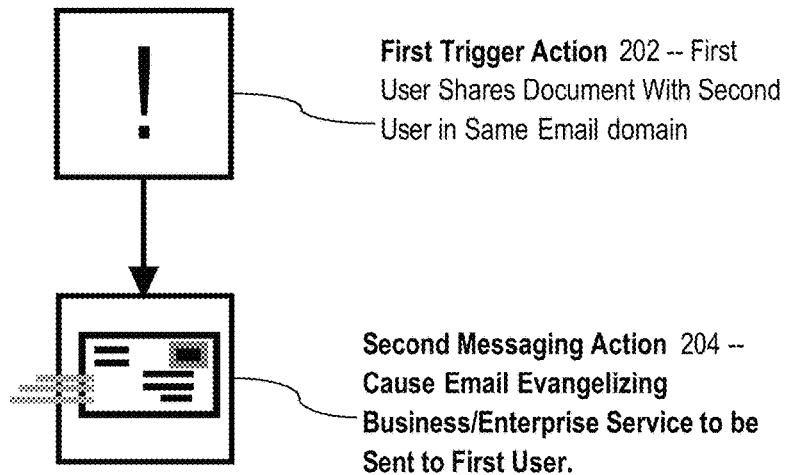
FIG. 2 is a directed graph representation of an example messaging track.

A trigger action (416) is taken based on an event detected for the user. Either the trigger action is the initial action, in which case the detected action may cause the user to be started on the messaging track, or the trigger action is not the initial action, in which case the detected action may cause the user to transition to a next action from the trigger action. The first action of the example messaging track of FIG. 2 and the second action of the example messaging track of FIG. 3 are examples of trigger actions.

A glue action (418) "glue" trigger actions 416 and messaging actions 414 together. A glue action can vary in type. One example of a glue action is a delay action. With a delay action, a user is paused on the messaging track for a duration before a next action is performed. The duration may be determined in a variety of different ways. For example, the duration may be specified by the track designer. For example, the duration might be specified as "one hour", "one day," "one week", etc., or "proceed at 8 AM on Nov. 10, 2018", or "proceed at 8 AM next Monday", or "proceed at noon tomorrow," or the like. Alternatively, the duration may be automatically determined based on an optimization algorithm. One possible approach for automatically determining the duration uses a batched multi-arm bandit approach as described in related U.S. patent application Ser. No. 15/793,787, entitled "Delayed Processing for Arm Policy Determination for Content Management System Messaging," filed Oct. 25, 2017.

Another type of glue action (418) is a branch action. A branch action allows a user to proceed along different paths of a messaging track. A branch action is associated with a condition and two or more downstream actions. The condition is evaluated. And depending on the result of evaluating the condition, one of two or more downstream actions is selected for the user to transition to according to the branch action. The second action in the example messaging track of FIG. 3 is an example of a branch action. The second action is configured to wait up to at most a determined period of time (duration) for a user to open a previously sent Email about a new online service feature. If the event of the user opening the Email is detected before the period of time expires, then the user is transitioned on the messaging track to the third action that sends a follow-up Email message to the user further evangelizing the new feature with more details about the new feature. Otherwise, if the event of the period of time expiring is detected before the event of the user opening the Email is detected, then the user is transitioned on the messaging track to the fourth action that sends the user a push notification about the new feature. The event of the period of time expiring can be scheduled to occur or "fire" after the period of time expires when the user is transitioned on the messaging track to the second action. This scheduling may be done with an event callback system or other asynchronous callback system that allows a caller to schedule a callback to the caller to occur at a specified time in the future. If the event of the user opening the previously sent Email is detected before the event of the period of time expiring is detected, then when the event of the period of time expiring is detected, it can be ignored or discarded.

Trigger actions (416) and glue actions (418) may be referred to herein as non-messaging actions.

Process 400 may be repeated multiple times for multiple users or for multiple messaging tracks.

In some embodiments, messaging tracks are versioned such that there may be multiple versions of a messaging track. In this case, one of the versions is a default version such that users to be placed on the messaging track are placed on the default version. However, users that are already on another non-default version of the messaging track remain on that version. This allows new versions of a messaging track to be deployed without affecting the older version or versions of the messaging track that have already been deployed and the users that are already placed on those older versions.

Example Messaging Tracks

Returning again to FIG. 2 and FIG. 3, the example messaging tracks 200 and 300 will now be described in greater detail. In some embodiments, tracks 200 and 300 are visually programmed by a messaging track designer using a messaging track designer system. In FIG. 2 and FIG. 3, messaging tracks 200 and 300 are depicted in a directed graph representation. Other messaging tracks may have more or fewer actions and/or other types of actions than those depicted in tracks 200 and 300.

Messaging track 200 consists of two actions 202 and 204. Action 202 is the initial action and is a trigger action. In particular, action 202 starts a user on track 200 if a particular event pertaining to the user is detected. The particular event may be visually programmed by the track designer. In this example, the particular event is that a first user shares a document with a second user where the first user and the second user have a common Email domain. For example, the common Email domain may be a corporate or business domain and the first user is using his or her personal account with an online service to share a business document with a co-worker. In this case, the operator of the online service may wish to promote to a business/enterprise level feature of the online service to the first user. This is captured by the second action 204, which is a messaging action. The messaging action 204 causes an Email to be sent to a user that is started on the track 200 immediately after the user completed the trigger action 202. The Email evangelizes a business/enterprise level feature of the online service.

Messaging track 300 consists of four actions 302, 304, 306, and 308. Action 302 is the initial action and is a messaging action. Since the initial action is not a trigger action, users may be started on the track 300 other than by detecting a particular event pertaining to a user. For example, an administrator or other user may start selected users and/or selected groups of users on the track. Once a user is started on the track 300, messaging action 302 causes a first Email to be sent to the user that evangelizes a new feature of an online service. The user is then immediately transitioned to a trigger action 304, which is a hybrid of a branch action and a delay action. At hybrid action 304, the user is paused on the track 300 until the earlier of: (a) an event is detected pertaining to the user that indicates that the user opened in the first Email, or (b) a period of time has elapsed since the first Email was delivered to the user. If the open Email event is detected first, then upon detecting the event, the user is transitioned to the third action 306 at which a second Email is caused to be sent to the user that provides further details about the new feature. Otherwise, the user is transitioned to the fourth action 308 at which a push notification is caused to be sent to the user about the new feature.

Track Analytics

Figure 5:
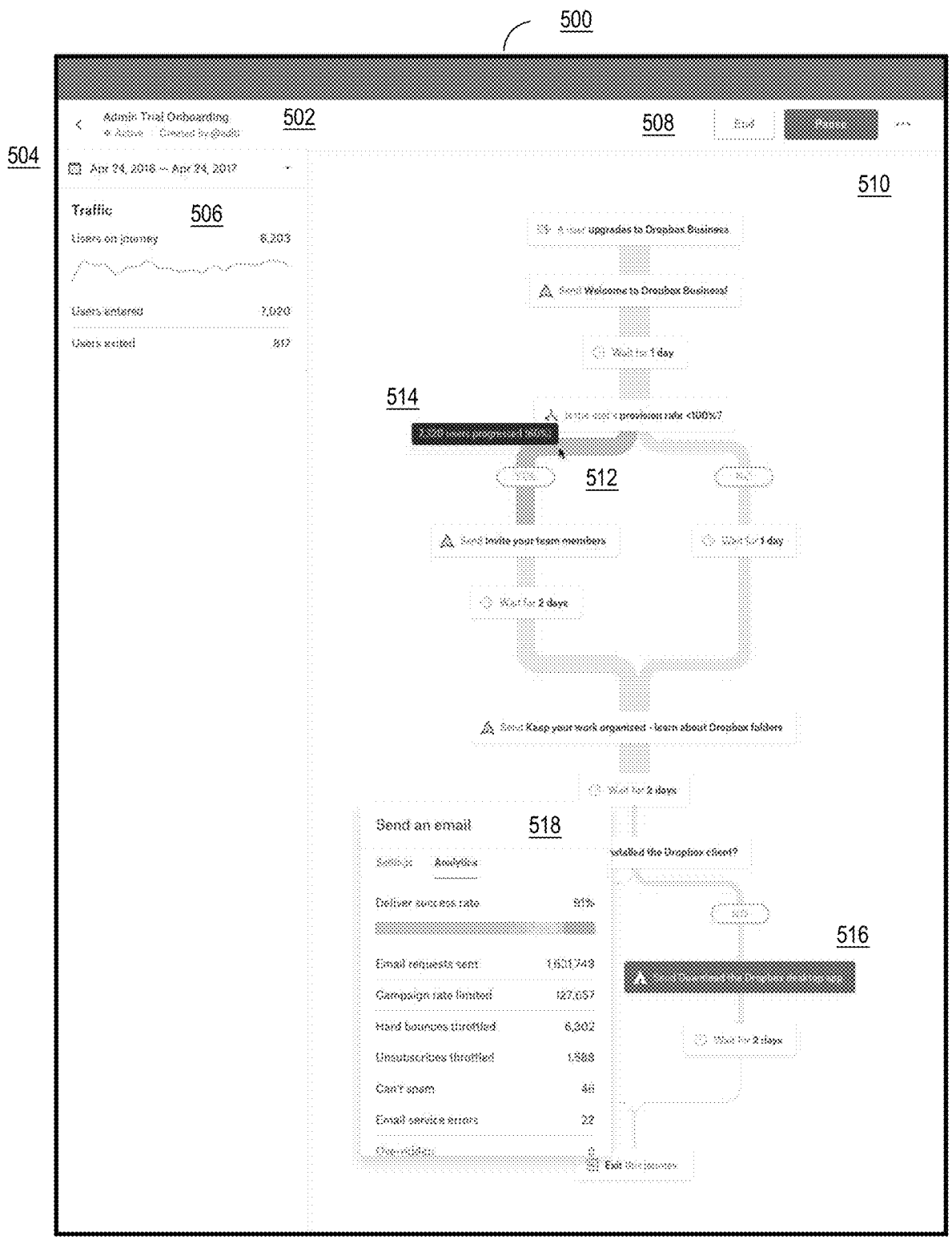
FIG. 5 is an example graphical user interface for presenting message track analytics.
Figure 6:
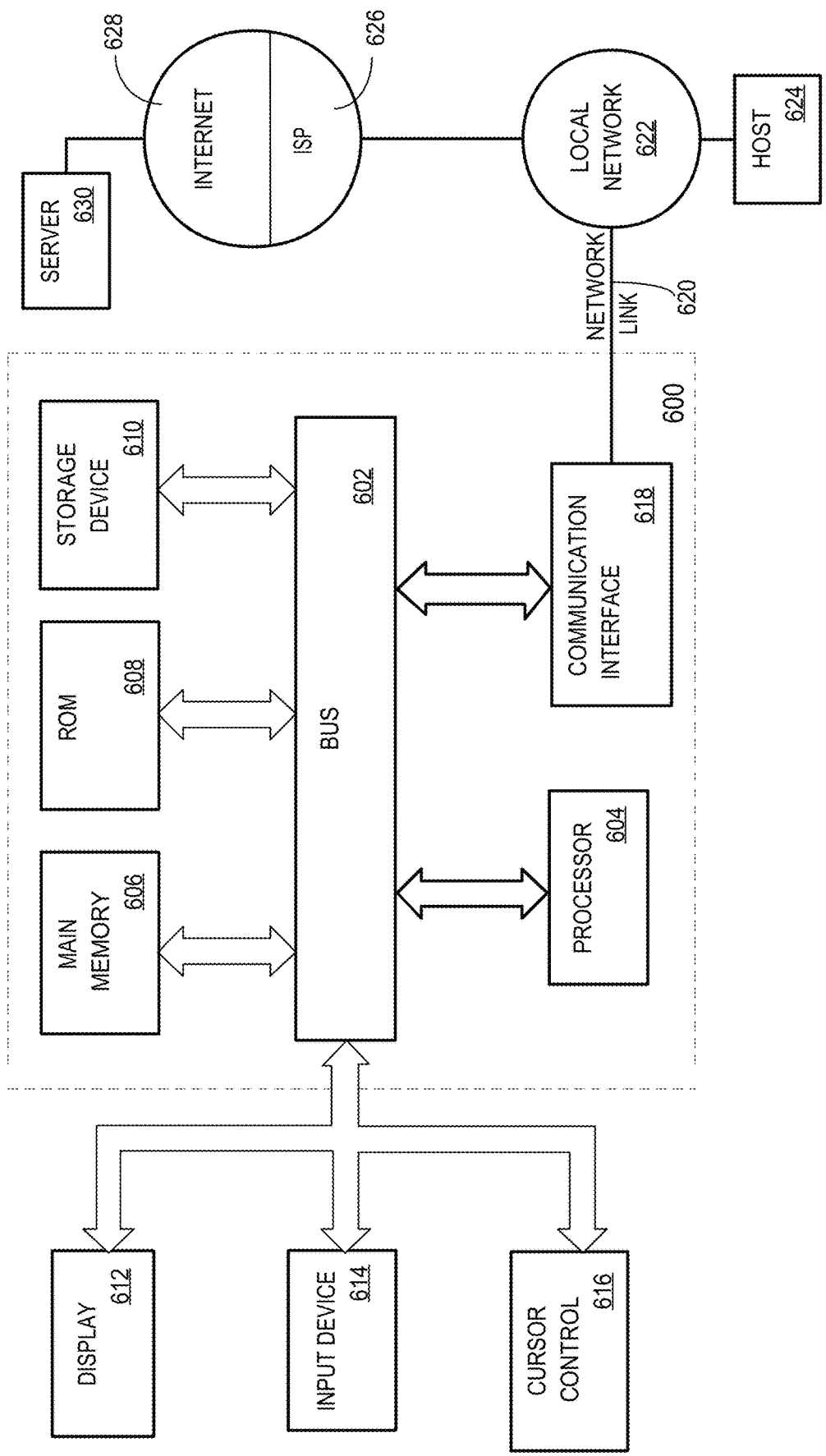
FIG. 6 is a block diagram that illustrates a computer system for event-based electronic communications management.

According to some embodiments, a user can interact with a graphical user interface that presents a directed graph representation of a messaging track in order to view analytics about the messaging track and determine its effectiveness. FIG. 5 depicts a graphical user interface 500 for viewing analytics of a messaging track. In this example, the messaging track is titled "Admin Trial Onboarding" and its current status if "Active," meaning it is actively processing users on the messaging track. The GUI 500 includes controls 504 for a user to select the date range for which to view analytics pertaining to the track. In this example, the date range of Apr. 24, 2016 through Apr. 24, 2017 is selected. The GUI 506 provides a panel which provides an overview of the traffic on the track in the date range. In particular, 7,020 users have started on the track during the date range and of those, 817 have exited during the date range. The GUI 500 provides user controls for pausing the processing of users on the track and ending the processing of users on the track. GUI 500 includes a directed graph representation 510 of the messaging track. Users can select individual directed edges or nodes to view analytics about the selected graph element. In this example, the user has selected directed edge 512 which causes pop-up dialog 514 to be displayed as an overlay to directed graph representation 510. Dialog 514 informs that 7,320 users have progressed on the track at least past the immediately preceding branch action, which represents 60% of the total number of users that have started on the track. Nodes can also be selected. For example, selection of node 516 corresponding to a messaging action reveals pop-up dialog 518 that provides statistics about delivery success rate of the message sent to users by the messaging action.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general-purpose microprocessor.

Computer system 400 also includes a main memory 406, such as a random-access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

Glossary

The following definitions are offered for purposes of illustration, not limitation, in order to assist with understanding the foregoing detailed description.

Email: Email (also known as electronic mail, email, or e-mail) is a method of exchanging messages between people using electronics. More information about Email is available on the Internet at /wiki/Email in the wikipedia.org domain, the entire contents of which is hereby incorporated by reference.

Pop-up notification: A pop-up notification (also known as a toasting, a poptart, a passive pop-up, a desktop notification, a notification bubble, a rusting, a balloon notification, or simply a notification) refers to a graphical user interface control element that communications certain information to a user without forcing the user to react (interact) with the notification immediately. More information about pop-up notifications is available on the Internet at /wiki/Pop_up_notification in the wikipedia.org domain, the entire contents of which is hereby incorporated by reference.

Push Notification: A push notification is a message that is "pushed" from a backend server or application to a user interface including, but not limited to, a user interface of a mobile application or a desktop application. More information about push notifications is available on the Internet at /wiki/Push_Notification in the wikipedia.org domain, the entire contents of which is hereby incorporated by reference.

Text Messaging: Text messaging, also known as texting, is the act of composing and sending electronic messages, typically consisting of alphabetic and numeric characters, between two or more users of mobile phones, tablets, desktops/laptops/or other devices. More information about text messaging is available on the Internet at/wiki/Text_messaging in the wikipedia.org domain, the entire contents of which is hereby incorporated by reference.

EXTENSIONS AND ALTERNATIVES

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

The invention claimed is:

1. A method comprising:
    obtaining a directed graph representing a programmed messaging track for evangelizing a feature of an online service, the directed graph having a plurality of nodes and one or more directed edges, each node of the plurality of nodes representing a respective action, each directed edge of the one or more directed edges being between two nodes of the plurality of nodes and representing a state transition on the programmed messaging track in direction of the directed edge from the respective action represented by one of the two nodes to the respective action represented by the other of the two nodes;
    wherein a first node of the plurality of nodes represents a particular respective trigger action of the programmed messaging track;
    wherein a second node of the plurality of nodes represents a particular respective messaging action of the programmed messaging track;
    wherein the first node is connected to the second node by a particular directed edge from the first node to the second node;
    detecting an event pertaining to a user of an online service, to a prior messaging action of the programmed messaging track, and to the particular respective trigger action of the programmed messaging track;
    based on the detecting the event, determining a current state of the user with respect to the programmed messaging track;
    wherein the current state of the user with respect to the programmed messaging track indicates that the user is on the programmed messaging track at the first node;
    based on the detecting the event, transitioning the user on the programmed messaging track including traversing, for the user, the directed graph from the first node to the second node;
    based on the traversing the directed graph for the user, triggering the particular respective messaging action represented by the second node for the user;
    prior to the detecting the event, causing the prior messaging action represented by a preceding node that precedes the first node in the programmed messaging track;
    wherein the causing the prior messaging action represented by the preceding node causes the user to receive a prior message specified by the prior messaging action, the prior message evangelizing the feature of the online service; and
    wherein the event represents the user opening the prior message.

2. The method of claim 1, wherein the triggering the particular respective messaging action represented by the second node for the user causes the user to receive a message according to the particular respective messaging action.

3. The method of claim 1, wherein the obtaining the directed graph is performed in response to the detecting the event.

4. The method of claim 1, further comprising:
displaying a graphical representation of the directed graph in a graphical user interface;
receiving a selection from the graphical user interface of the particular directed edge of the directed graph; and
based on the receiving the selection, displaying an indication of a number of users for which the particular respective trigger action represented by the first node has been completed.

5. The method of claim 1, further comprising:
displaying a graphical representation of the directed graph in a graphical user interface;
receiving a selection from the graphical user interface of the particular directed edge of the directed graph; and
based on the receiving the selection, displaying an indication of a percentage of a number of users started on the programmed messaging track for which the particular respective trigger action represented by the first node has been completed.

6. The method of claim 1, further comprising:
displaying a graphical representation of the directed graph in a graphical user interface;
receiving a selection from the graphical user interface of the second node of the directed graph; and
based on the receiving the selection, displaying an indication of a percentage of a number of users for which delivery of a message according to the particular respective messaging action is attempted for which delivery of the message is successful.

7. The method of claim 1, wherein the triggering the particular respective messaging action represented by the second node for the user causes sending an Email message to the user according to the particular respective messaging action.

8. The method of claim 1, wherein the triggering the particular respective messaging action represented by the second node for the user causes sending a push notification to the user according to the particular respective messaging action.

9. The method of claim 1, wherein the triggering the particular respective messaging action represented by the second node for the user causes sending a text message to the user according to the particular respective messaging action.

10. The method of claim 1, wherein the triggering the particular respective messaging action represented by the second node for the user causes presentation of a pop-up notification to the user according to the particular respective messaging action.

11. A computing system comprising:
one or more processors;
storage media;
one or more programs stored in the storage media, the one or more programs comprising instructions which, when executed by the one or more processors, cause the computing system to perform:
obtaining a directed graph representing a programmed messaging track for evangelizing a feature of an online service, the directed graph having a plurality of nodes and one or more directed edges, each node of the plurality of nodes representing a respective action, each directed edge of the one or more directed edges being between two nodes of the plurality of nodes and representing a state transition on the programmed messaging track in direction of the directed edge from the respective action represented by one of the two nodes to the respective action represented by the other of the two nodes;
wherein a first node of the plurality of nodes represents a particular respective trigger action of the programmed messaging track;
wherein a second node of the plurality of nodes represents a particular respective messaging action of the programmed messaging track;
wherein the first node is connected to the second node by a particular directed edge from the first node to the second node;
detecting an event pertaining to a user of an online service, to a prior messaging action of the programmed messaging track, and to the particular respective trigger action of the programmed messaging track;
based on the detecting the event, determining a current state of the user with respect to the programmed messaging track;
wherein the current state of the user with respect to the programmed messaging track indicates that the user is on the programmed messaging track at the first node;
based on the detecting the event, transitioning the user on the programmed messaging track including traversing, for the user, the directed graph from the first node to the second node;
based on the traversing the directed graph for the user, triggering the particular respective messaging action represented by the second node for the user;
prior to the detecting the event, causing the prior messaging action represented by a preceding node that precedes the first node in the programmed messaging track;
wherein the causing the prior messaging action represented by the preceding node causes the user to receive a prior message specified by the prior messaging action, the prior message evangelizing the feature of the online service; and
wherein the event represents the user opening the prior message.

12. The computing system of claim 11, wherein the triggering the particular respective messaging action represented by the second node for the user causes sending of a message to the user according to the particular respective messaging action.

13. The computing system of claim 11, wherein the instructions, when executed by the one or more processors, further cause the computing system to perform:
obtaining the directed graph is in response to detecting the event.

14. The computing system of claim 11, wherein the instructions, when executed by the one or more processors, further cause the computing system to perform:
displaying a graphical representation of the directed graph in a graphical user interface;
receiving a selection from the graphical user interface of the particular directed edge of the directed graph; and
based on the receiving the selection, displaying an indication of a number of users for which the particular respective trigger action represented by the first node has been completed.

15. The computing system of claim 11, wherein the instructions, when executed by the one or more processors, further cause the computing system to perform:
displaying a graphical representation of the directed graph in a graphical user interface;

receiving a selection from the graphical user interface of the particular directed edge of the directed graph; and based on the receiving the selection, displaying an indication of a percentage of a number of users started on the programmed messaging track for which the particular respective trigger action represented by the first node has been completed.

16. One or more non-transitory storage media storing instructions which, when executed by a computing system having one or more processors, cause the computing system to perform:

obtaining a directed graph representing a programmed messaging track for evangelizing a feature of an online service, the directed graph having a plurality of nodes and one or more directed edges, each node of the plurality of nodes representing a respective action, each directed edge of the one or more directed edges being between two nodes of the plurality of nodes and representing a state transition on the programmed messaging track in direction of the directed edge from the respective action represented by one of the two nodes to the respective action represented by the other of the two nodes;

wherein a first node of the plurality of nodes represents a particular respective trigger action of the programmed messaging track;

wherein a second node of the plurality of nodes represents a particular respective messaging action of the programmed messaging track;

wherein the first node is connected to the second node by a particular directed edge from the first node to the second node;

detecting an event pertaining to a user of an online service, to a prior messaging action of the programmed messaging track, and to the particular respective trigger action of the programmed messaging track;

based on the detecting the event, determining a current state of the user with respect to the programmed messaging track;

wherein the current state of the user with respect to the programmed messaging track indicates that the user is on the programmed messaging track at the first node;

based on the detecting the event, transitioning the user on the programmed messaging track including traversing, for the user, the directed graph from the first node to the second node, if the user is on the programmed messaging track and the particular respective trigger action is a next trigger action on the programmed messaging track;

based on the traversing the directed graph for the user, triggering the particular respective messaging action represented by the second node for the user;

prior to the detecting the event, causing the prior messaging action represented by a preceding node that precedes the first node in the programmed messaging track;

wherein the causing the prior messaging action represented by the preceding node causes the user to receive a prior message specified by the prior messaging action, the prior message evangelizing the feature of the online service; and wherein the event represents the user opening the prior message.

17. The one or more non-transitory storage media of claim 16, wherein the triggering the particular respective messaging action represented by the second node for the user causes the user to receive a message according to the particular respective messaging action.

18. The one or more non-transitory storage media of claim 16, wherein the obtaining the directed graph is performed in response to the detecting the event.

19. The one or more non-transitory storage media of claim 16, further comprising instructions which, when executed by the computing system, cause the computing system to perform:

displaying a graphical representation of the directed graph in a graphical user interface;

receiving a selection from the graphical user interface of the particular directed edge of the directed graph; and based on the receiving the selection, displaying an indication of a number of users for which the particular respective trigger action represented by the first node has been completed.

20. The one or more non-transitory storage media of claim 16, further comprising instructions which, when executed by the computing system, cause the computing system to perform:

displaying a graphical representation of the directed graph in a graphical user interface;

receiving a selection from the graphical user interface of the particular directed edge of the directed graph; and based on the receiving the selection, displaying an indication of a percentage of a number of users started on the programmed messaging track for which the particular respective trigger action represented by the first node has been completed.

* * * * *